United States Patent [19]
Eickemeyer

[11] Patent Number: 5,313,634
[45] Date of Patent: May 17, 1994

[54] COMPUTER SYSTEM BRANCH PREDICTION OF SUBROUTINE RETURNS

[75] Inventor: James Eickemeyer, Binghamton, N.Y.

[73] Assignee: International Business Machines Corporation, Armonk, N.Y.

[21] Appl. No.: 920,946

[22] Filed: Jul. 28, 1992

[51] Int. Cl.⁵ ............................................. G06F 9/42
[52] U.S. Cl. .............................. 395/700; 364/DIG. 1; 364/261.7; 364/285.4
[58] Field of Search .................. 364/DIG. 1, DIG. 2; 395/375, 700

[56] References Cited

U.S. PATENT DOCUMENTS

| | | | |
|---|---|---|---|
| 4,370,711 | 1/1983 | Smith | 364/DIG. 1 |
| 4,430,706 | 2/1984 | Sand | 364/DIG. 1 |
| 4,435,756 | 3/1984 | Potash | 364/DIG. 1 |
| 4,763,245 | 8/1988 | Emma et al. | 364/DIG. 1 |
| 4,853,840 | 8/1989 | Shibuya | 364/DIG. 1 |
| 4,858,104 | 8/1989 | Matuso et al. | 364/DIG. 1 |
| 4,977,496 | 11/1990 | Onishi et al. | 364/DIG. 1 |
| 4,984,154 | 1/1991 | Hanatani et al. | 364/DIG. 1 |
| 5,093,778 | 3/1992 | Favor et al. | 395/375 |
| 5,136,696 | 8/1992 | Beckwith et al. | 395/375 |
| 5,163,140 | 11/1992 | Stiles et al. | 364/DIG. 1 |

Primary Examiner—Thomas M. Heckler
Attorney, Agent, or Firm—Lynn L. Augspurger

[57] ABSTRACT

Described is a branch unit that predicts branch instruction target addresses. The prediction is improved by using a Call-Return Stack to predict subroutine routine branches. The mechanism is designed for high-performance processors where call and return instructions may overlap in execution or may be issued speculatively. The mechanism maintains the state for the known execution trace and tracks speculative execution traces.

35 Claims, 3 Drawing Sheets

PREDICTION

```
SWITCH (INSTRUCTION_TYPE) {
    CASE POTENTIAL_CALL:
        INCREMENT P (MODULO N);
        CRS[P] = NSIA;
        IF (BHT_HIT) PREDICTION = BHT_PREDICTION;
        ELSE PREDICTION = BHT_MISS_PREDICTION;
        BREAK;

CASE POTENTIAL_RETURN:
        IF (BHT_HIT) PREDICTION = BHT_PREDICTION;
        ELSE IF (UNCONDITIONAL_BRANCH) {
            PREDICTION = CRS[P];
            DECREMENT P (MODULO N);
        }
        ELSE PREDICTION = BHT_MISS_PREDICTION;
        BREAK;

CASE OTHER_BRANCH:
        IF (BHT_HIT) PREDICTION = BHT_PREDICTION;
        ELSE PREDICTION = BHT_MISS_PREDICTION;
        BREAK;
}
```

FIG.4

PREDICTION UPDATE

```
SWITCH (INSTRUCTION_TYPE) {
    CASE POTENTIAL_CALL:
        INCREMENT U (MODULO N);
        IF (INCORRECT_PREDICTION) P = U;
        BHT_PREDICTION_UPDATE;
        BREAK;

CASE POTENTIAL_RETURN:
        IF (INCORRECT_PREDICTION) {
            P = U;
            BHT_PREDICTION_UPDATE;
        }
        ELSE IF (PREDICTION_WAS_FROM_CRS) {
            DECREMENT U (MODULO N);
        }
        ELSE BHT_PREDICTION_UPDATE;
        BREAK;

CASE OTHER_BRANCH:
        IF (INCORRECT_PREDICTION) P = U;
        BHT_PREDICTION_UPDATE;
        BREAK;
}
```

FIG.5

COMPUTER SYSTEM BRANCH PREDICTION OF SUBROUTINE RETURNS

FIELD OF THE INVENTION

This invention relates to computers and computer systems and particularly to branch prediction.

CROSS REFERENCE TO RELATED APPLICATIONS

This application is related to the following U.S. patent application filed concurrently herewith: U.S. patent application Ser. No. 07/920,947 filed Jul. 28, 1992, of Eickemeyer et al entitled: "Computer System to Predict Addresses and Prefetch Data".

This co-pending application and the present application are owned by one and the same assignee, International Business Machines Corporation of Armonk, N.Y.

The description set forth in the co-pending application is hereby incorporated into the present application by this reference.

GLOSSARY OF TERMS

While dictionary meanings are also implied by certain terms used here, the following glossary of some terms may be useful.

NSIA Next Sequential Instruction Address: the address of the next instruction in memory after the current instruction; computed as the address of the current instruction plus the size of the current instruction.

Call instruction A computer branch instruction that saves the NSIA (usually in a register) and branches to another instruction.

Return instruction A computer branch instruction that branches to a previously saved NSIA (usually located in a register).

Potential Call instruction An instruction that is or could be a Call instruction. Many computer instruction sets do not explicitly designate a Call instruction but have an instruction that has other functions in addition to a call. It is frequently not possible to distinguish in hardware which function is performed.

Potential Return instruction An instruction that is or could be a Return instruction. Many computer instruction sets do not explicitly designate a Return instruction but have an instruction that has other functions in addition to a return. It is frequently not possible to distinguish in hardware which function is performed.

REFERENCES USED IN THE DISCUSSION OF THE INVENTION

During the detailed description which follows the following works will be referenced as an aid for the reader. These additional references are:

1. IBM Corp., Enterprise Systems Architecture/390 Principles of Operation, SA22-7201-0, 1990.
2. P. M. Kogge, *The Architecture of Pipelined Computers*, New York, N.Y.: McGraw-Hill, 1981.
3. A. J. Smith, "Cache Memories," *Computing Surveys*, vol. 14, no. 3, pp. 473-530, September 1982.
4. J. K. Lee and A. J. Smith, "Branch Prediction Strategies and Branch Target Buffer Design," *IEEE Computer*, January 1984.

These additional references are incorporated by reference.

BACKGROUND OF THE INVENTION

As background for our invention consider previous publications in the similar area. IBM Technical Disclosure Bulletin Vol. 34, No. 11, April 1992, pp. 269-271 "Return Address Stack Cache" by Barrera et al describes a stack for saving subroutine return addresses. The NSIA is saved in the LIFO stack mechanism as the Call instruction completes. The prediction for a Return target address is predicted from the top address in the stack. The stack is not adjusted until the Return completes. If there is a Call in progress (after branch prediction and before the prediction is verified and updated) a Return prediction must wait for the Call to finish. Similarly if a Return is in progress, another Return prediction must wait. As computer processors become faster by executing more instructions at a time, this waiting is significant. This mechanism is described for a computer instruction set with explicit Call and Return instructions.

IBM Technical Disclosure Bulletin Vol. 30, No. 11, April 1988, pp. 221-225 "Subroutine Call/Return Stack" by Webb describes a pair of stacks for saving subroutine addresses. This mechanism uses a branch history table with an extra bit in each entry to identify Return instructions. A Return is identified when the branch prediction is verified for the Return. If the stack prediction was correct, a potential return instruction must have functioned as a Return. Consequently, the first time a particular potential Return is encountered, it is not handled as a Return. On subsequent executions of the instruction, the Branch History Table identifies the instruction as a Return and it is predicted using the stack. This mechanism requires two stacks, which are each used in associative searches to find the prediction of a Return and to identify Returns.

IBM Technical Disclosure Bulletin Vol. 24, No. 7A, December 1981, pp. 3255-3258 "Subroutine Return Address Stack" by Losq describes a stack for saving return addresses and the register identifier in which the address is saved on a Call and branched to in a Return. This filters out some cases of potential Calls and Returns that do not implement the Call and Return functions. Therefore the stack is used to predict a Return only if the register identifier at the top of the stack matches the register identifier in the instruction. This mechanism does not handle a Return prediction if another Call or Return is in progress.

SUMMARY OF THE INVENTION

Our invention deals with the use of a LIFO stack of saved return addresses. The improvements which we have made achieve better performance and are more generally applicable than previous art.

The stack is managed by two pointers which track completed instructions and instructions still in execution. An instruction still executing may or may not complete since execution can be initiated speculatively. A potential Return instruction, still in execution, may or may not implement a Return function. Thus, the uncertainty of instruction function and the speculative execution of high-performance processors are both handled by the invention.

The mechanism is improved when used with a history-based branch prediction mechanism, but this is not required. A potential Return does not have to be identified as implementing a return prior to branch prediction.

These and other improvements are set forth in the following detailed description. For a better understanding of the invention with advantages and features, refer to the description and to the drawings.

BRIEF DESCRIPTION OF THE DRAWINGS

Our detailed description explains the preferred embodiments of our invention, together with advantages and features, by way of example with reference to the following drawings.

FIG. 4 shows the branch prediction algorithm.

FIG. 5 shows the branch prediction update algorithm.

DETAILED DESCRIPTION OF THE INVENTION

Figure 3:
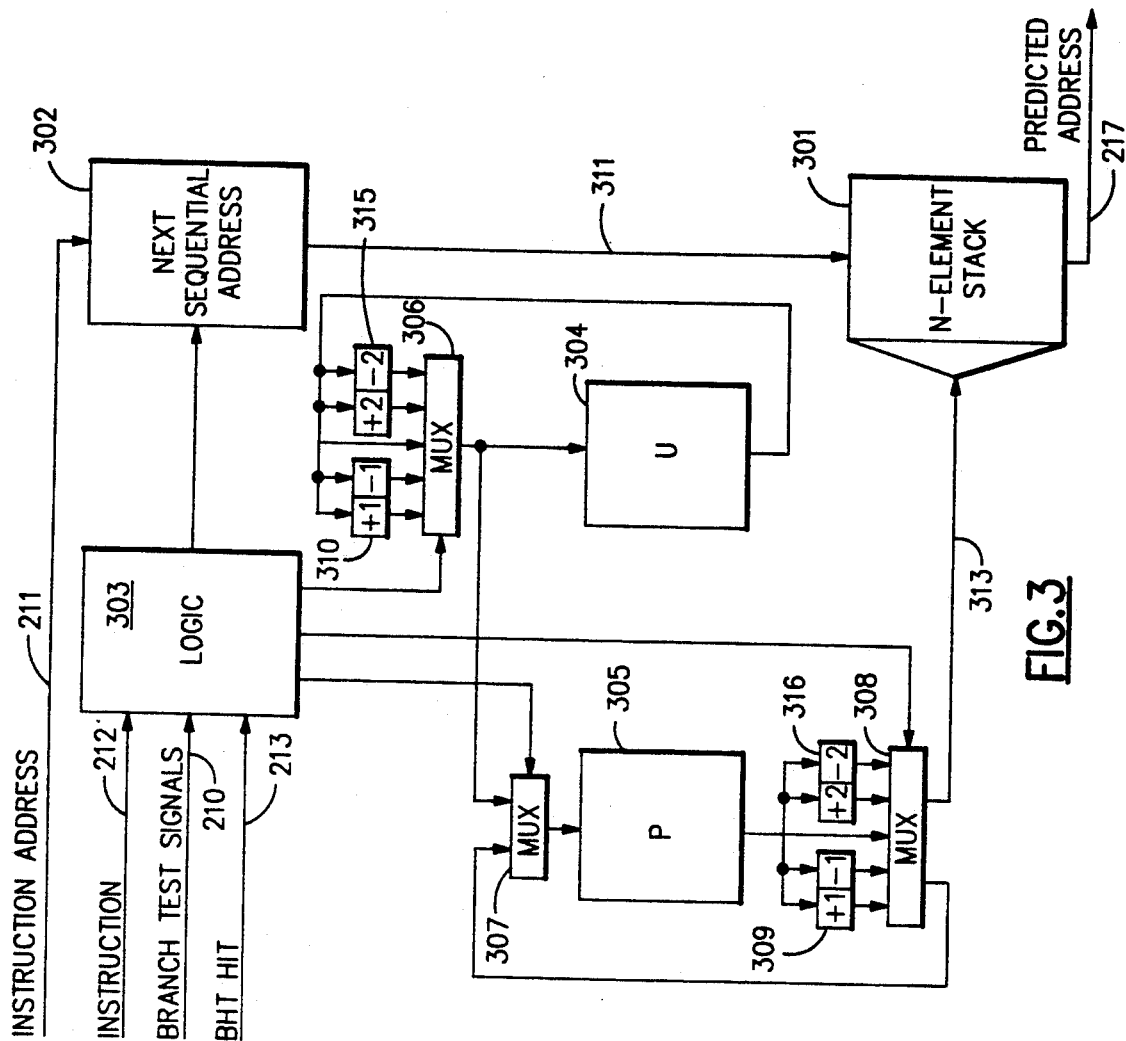
FIG. 3 shows the Call-Return Stack of FIG. 2 in more detail.

Before considering our preferred embodiments in detail, it may be worthwhile to illustrate, by way of example, the types of problems addressed by this invention.

A subroutine is a useful programming concept in that a common set of functions can be grouped together and initiated from more than one of the other parts of a program. A part of a program can initiate a subroutine with a Call, which saves the NSIA and branches to the start of the subroutine. At the end of the subroutine, a Return branches to the saved NSIA, passing program control back to the original part of the program to continue execution. Another part of the program can use the same subroutine through a Call, and the subroutine Return restores control back to this part of the program. Note that in the two instances of Returns, the target addresses may be different. This is a characteristic of Return instructions that makes prediction more difficult than for other types of branch instructions, including Calls. Within a subroutine, another subroutine can be called. The return from the second subroutine restores control to the first subroutine. In this manner, any number of levels of subroutine can be nested, forming a LIFO stack structure.

Because this is a common and useful technique, computer processors have implemented an instruction to branch to an address and save the address of the next instruction in a register. For example, in IBM ESA/390 instruction set architecture as described in IBM Corp., Enterprise Systems Architecture/390 Principles of Operation, SA22-7201-0, 1990, instruction BAL computes an address from two registers and a displacement field in the instruction and branches to that address. The address of the next instruction (address of BAL plus four bytes) is saved in a register. In IBM ESA/390 instructions BALR, BAS, BASR, and BASSM function similarly. Each of these instructions performs the Call function. However, each of these could also be used for other functions that act like a Call but do not have a corresponding Return. Some of these instructions also have a form in which no branch is performed; this form is easily detected in hardware and is not included in subsequent discussions.

A Return instruction in IBM ESA/390 can be implemented with instruction BCR. This instruction checks the conditions codes under control of a mask field in the instruction. One form of the mask is "always branch" in which case no condition code checking is needed; this is an unconditional branch. Otherwise the branch is conditional. Since BAL saved NSIA in a register and BCR branches to an address in a register, the two form a Call-Return pair. In addition to BCR, BSM can also function as a return. There are other programming constructs implemented such that it is useful to branch to an address in a register. Hardware can easily detect the unconditional branch, but identifying it as a Return is not always possible.

Because BAL and BCR can each have multiple functions and because these functions are not readily determined without special hardware (the function cannot always be determined even with special hardware) this represents one important issue in designing branch prediction for Return instructions. At the time of prediction, any instruction that has the characteristics of a Call, for example, a BAL, is termed a potential Call. Likewise, an instruction that has the characteristics of a Return, such as BCR, is termed a potential Return. It is possible for an instruction decoder to examine opcode and other fields of the instruction to rule out cases that are clearly not Calls or Returns, such as BCR with mask "no branch." Some instruction sets have explicit Call and Return instructions, so a potential Call is known to function as a Call.

A common technique in building a high-performance processor is pipelining, as described in P. M. Kogge, *The Architecture of Pipelined Computers*, New York, N.Y.: McGraw-Hill, 1981. Examples of the implementation of pipelined instructions are shown. In the examples, the pipeline consists of the following stages:

Fetch (F): the instruction is fetched from memory.

Decode (D): the instruction is decoded.

Address generation (A): the storage address is computed.

Execution is divided into three types of operations and may require one or more of these types of operations:

Read Data (R): data are fetched from cache.

Write Data (W): data are stored to the cache.

Execute (E): the processor computes, or operates, or some data.

Put-away (P): the processor stores data in a register.

Branch instructions have some different operations:

Prediction (p): the branch direction is predicted and target address is calculated; the target is fetched the next cycle.

Branch Test (B): the branch prediction is verified; if the prediction is incorrect, the correct target is fetched the next cycle.

Update (u): the prediction hardware is updated.

The timing of a short sequence of instructions with three branches, each predicted correctly, is thus:

```
                                  111111
       cycle:       123456789012345
       I1:          F..DAEP
       Br1:         Fp...Bu
       I2:              FDAEP
       I3:              F.DAEP
       I4:               F.DAEP
       I5:               F..DAEP
       Br2:              Fp...Bu
       I6:                  FDAEP
       I7:                  F.DAEP
       I8:                   F.DAEP
       I9:                   F..DAEP
```

| Br3: | Fp...Bu |
|---|---|

Instruction I1 executes in cycle 6. Branch Br1 predicts the target address in cycle 3 and fetches instruction I2 in cycle 4. Br1 prediction is verified in cycle 7 after I1 completes execution. Some instructions are shown fetching at the same time because the bus between instruction cache and the processor is typically more than one instruction in width. There may be zero or more cycles between the instruction fetch and decode since multiple instructions are fetched at once and some instruction execution may take many cycles. An instruction buffer holds the fetched instructions until decode. One instruction executes at a time. Note that branch Br1 has not updated by the time branch Br2 is predicted; but, branch Br3 has not yet been fetched.

For processors to increase in performance, a frequent method employed is to execute multiple instructions at once. The next example shows the same instructions executed two-at-a-time.

|  | 111 |
|---|---|
| cycle: | 123456789012 |
| I1: | F..DAEP |
| Br1: | Fp...Bu |
| I2: |    FDAEP |
| I3: |    FDAEP |
| I4: |    F.DAEP |
| I5: |    F.DAEP |
| Br2: |    Fp...Bu |
| I6: |      FDAEP |
| I7: |      FDAEP |
| I8: |      F.DAEP |
| I9: |      F.DAEP |
| Br3: |      Fp...Bu |

In particular, instructions I2 and I3 both execute in cycle 7. More instructions are fetched at once due to the increased processor execution rate requirement. The total time for the instructions has been reduced by the parallel execution. It is important to note that before branch Br1 updates, both Branches Br2 and Br3 have been predicted. The faster execution results in more branches pending, or overlapped, at one time.

The importance of one branch not yet updated and another branch already predicted is that if the second branch prediction could benefit from the first branch update, this information is not available. If Br1 is a Return and Br3 is also a Return, a prediction method for Return instructions must handle the overlap case to be successful in faster processors.

Another issue in high-performance processors is speculative execution, where a branch is predicted and the target instructions begin execution. If the prediction is correct, time has been saved instead of waiting until the branch outcome was certain. If execution proceeds down the wrong path, the processor must cancel those instructions and guarantee that those instructions do not effect the state of the processor, either by not storing the results until the branch direction is known, or by implementing techniques to allow restoration of correct values. The following example shows execution of several instructions after an incorrectly predicted branch. In this case, no instruction completes while the branch is pending.

|  | 11111 |  |
|---|---|---|
| cycle: | 12345678901234 |  |
| I1: | F...DAEP |  |
| Br1: | Fp....Bu | <-prediction found to be wrong |
| I2': | F.DAE | <-cancelled |
| I3': | F..DA | <-cancelled |
| I4': | F..D | <-cancelled |
| I5': | F... | <-cancelled |
| Br2': | Fp. | <-cancelled, no update phase |
| I2: |    FDAEP | <-correct |
| I3: |    F.DAEP | <-correct |

Branch Br1 is predicted in cycle 3 and verified in cycle 8 where the prediction is found to be incorrect. Branch Br2' is predicted in cycle 7 even though it is on the wrong path. However, the branch is cancelled before the update could occur. If this branch is a Call or a Return, the prediction stage should not adversely effect any subsequent Call or Return predictions on the correct path.

Another requirement for branch prediction in high-performance processors is that it may be useful to verify prediction of more than one branch at a time. It is desirable to limit the additional hardware and complexity required to implement this function.

From these trends in high-performance processors, it can be observed that a simple LIFO stack is insufficient for Return branch prediction. A rapid sequence of Calls and Returns should be predicted correctly without stalling until previous branches are updated. A speculative branch should modify the prediction for subsequent branches only if the first branch completes. Otherwise, the prediction of the second branch may be incorrect.

The Preferred Embodiment

Figure 1:
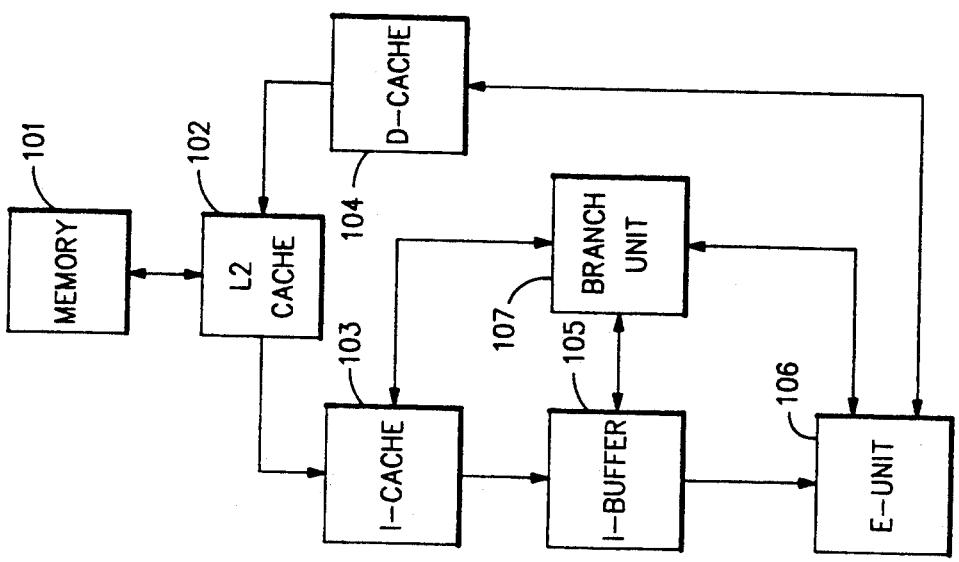
FIG. 1 shows schematically an overview of the preferred embodiment and particularly shows a branch unit added to a typical computer organization.

Turning now to our invention in greater detail, it will be seen that FIG. 1 illustrates our preferred embodiment in which a typical computer organization is shown. As requested by the execution unit (E-unit) 106, instructions are fetched into instruction buffer (I-buffer) 105 from instruction cache (I-cache) 103. If there is a miss at I-cache 103, the second-level cache (L2 cache) 102 provides the instructions, or if a miss there, instructions are supplied from memory 101. This handling of caches is typical of most computer systems, as described in A. J. Smith, "Cache Memories," *Computing Surveys*, vol. 14, no. 3, pp. 473-530, September 1982. The control of instruction fetching, determining which instructions to fetch, is performed by branch unit 107. The branch unit issues request to I-cache 103 and I-buffer 105, examines instructions in I-buffer, and monitors state of execution of conditional branch instructions in E-unit 106. Instructions are processed by E-unit 106. In a typical computer organization, E-unit moves data to and from the storage system with load and store instructions. For example, a load instruction requests data to be fetched from the data cache (D-cache) 104, or if there is a D-cache miss, from L2 cache 102, or if a miss there, from memory 101. In a store instruction, E-unit 106 sends the data to D-cache 104, and possibly L2 cache 102 and memory 101.

Figure 2:
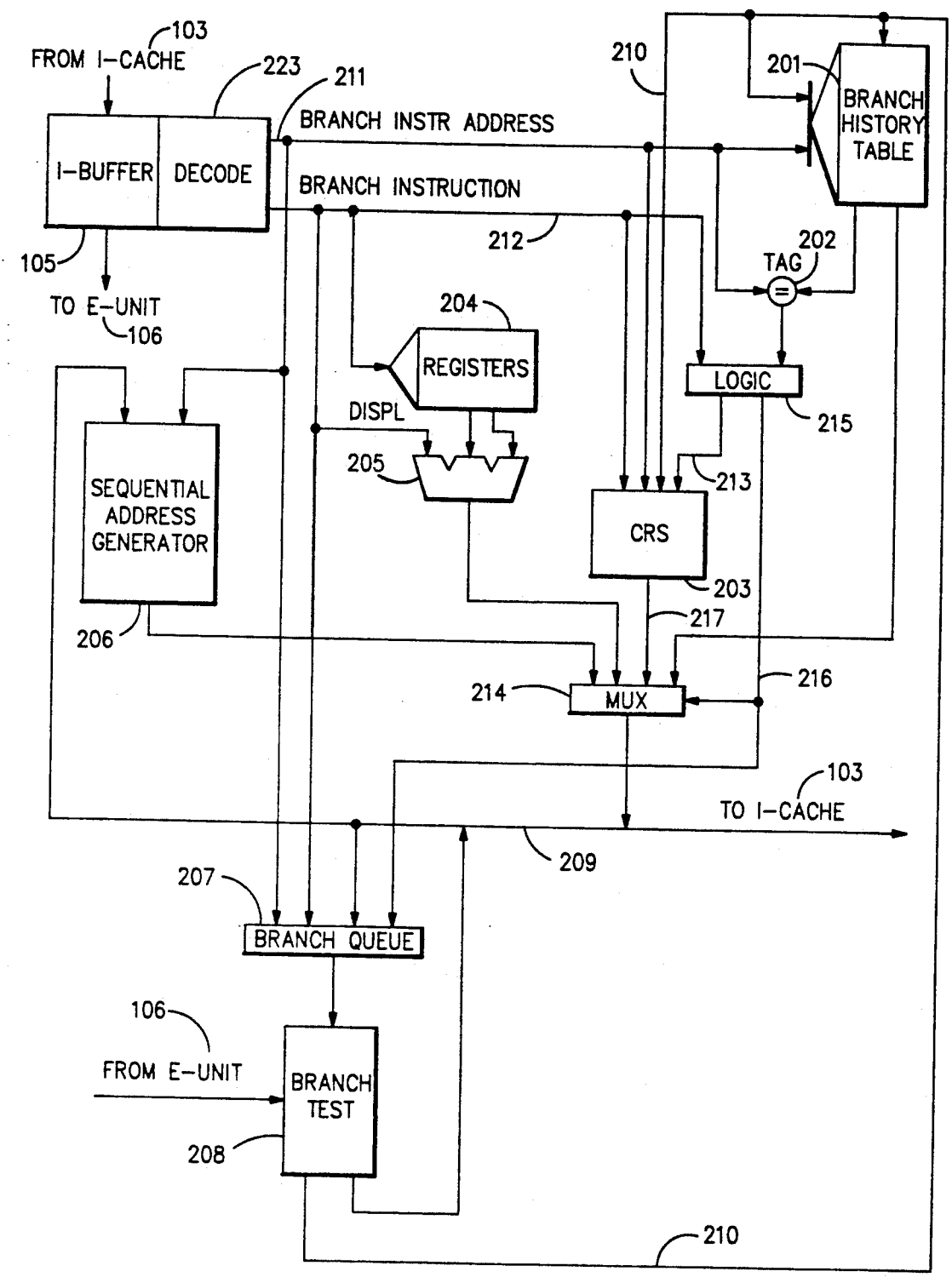
FIG. 2 shows the branch unit of FIG. 1 in more detail.

FIG. 2 shows a detailed description of Branch Unit 107. This shows a typical Branch Unit using a Branch History Table 201 for prediction and a Branch Queue 207 to save information about pending branch instructions. The Branch Test 208 consists of comparing condition codes from E-unit 106 with the condition specified in the branch instruction. The predicted target fetch is also verified in Branch Test hardware. This invention describes the Call-Return Stack (CRS) 203 and its relationship to the branch unit.

A branch instruction is detected in I-buffer 105 by decoding or partially decoding instructions in decode unit 223. Decode unit 223 identifies the branch and sets up the controls necessary to process the instruction. The control paths are not shown in the figure, for clarity, but consist of the usual controls for pipeline latches and multiplexors present in a pipelined processor.

Branch prediction can be accomplished by many different methods, several of which are described in J. K. Lee and A. J. Smith, "Branch Prediction Strategies and Branch Target Buffer Design," *IEEE Computer*, January 1984. The invention describes one particular combination of methods. The branch instruction is transmitted to logic box 215. For some branches no further information is needed to predict. For example, a conditional branch might specify "no branch". For other branches, the branch instruction address 211 is used to access Branch History Table (BHT) 201. The BHT contains history of past branches, consisting of the branch direction and the target address. Comparator 202 determines if an entry for the branch instruction address is found in BHT, a hit, or if it is not found, a miss. The branch target address is computed from the instruction by accessing register(s) specified in the instruction from the register file 204 and adding the displacement specified in the instruction, in adder 205. Sequential Address Generator 206 computes the address of the next instruction. If the branch is a potential Call or potential Return, CRS 203 generates a prediction 217.

Logic 215 determines which prediction method is used based on the branch instruction itself indicating a potential Return or a non-taken branch, for example, and the BHT hit or miss. The address is selected from sequential address 206, CRS 203, adder 205, or BHT 201 by an algorithm described later.

The result of the prediction is the predicted target address transmitted on line 209 to I-cache 103 and to the branch queue 207 and sequential address generator 206 in preparation for the next instruction fetch. The branch queue also contains information necessary to verify the prediction and update the prediction hardware: the branch instruction, branch instruction address, predicted address, and method of prediction. When E-unit 106 signals that the branch can be verified, the condition code is checked and the correct target address is determined and compared to the predicted address. If the prediction were incorrect, the correct address is sent to I-cache 103 and sequential address generator 206 on line 209. The information to update prediction hardware, taken or non-taken branch, target address, method of prediction, and Call or Return indicator is sent on line 210.

FIG. 3 shows the detail of the Call-Return Stack 203. At prediction time, an instruction 212 is detected to be a Call or a Return in logic box 303. This generates the control signals for CRS. A Call to be predicted results in the NSIA being computed 302 and sent to the stack 301 via line 311. Stack 301 consists of N registers, each containing one address. Register P 305 contains the pointer for stack 301 used for prediction and register U 304 contains the pointer for stack 301 used for prediction update. The pointer values are incremented or decremented using boxes 309 and 310 according to the control algorithm. Selection of pointer values are controlled by multiplexors 306, 307, and 308 under control of logic 303. The prediction is further controlled based on the BHT outcome 213. Prediction update is further controlled from result of branch test 210.

The algorithm for generating the prediction is described in FIG. 4 using pseudo-code. Reference is also made to FIGS. 2 and 3. If the branch instruction to be predicted is a Call or potential Call instruction, BHT is accessed to determine the prediction. If there is a BHT hit, the prediction is obtained from BHT. Otherwise, the rules for a miss are used. For the illustration in FIG. 2, the prediction on a BHT miss is to compute an address in adder 205 and, based on the instruction opcode, either predict taken using the computed address, or predict not taken using the sequential address 206. CRS takes actions to save the return address. The prediction pointer, P, 305 is incremented. CRS indexing ranges from 0 to $N-1$ and is handled as a circular structure. If the value of P is currently $N-1$, the increment results in P set to 0. NSIA is stored at CRS location P.

If the branch instruction to be predicted is a Return or potential Return instruction, BHT is accessed to determine the prediction. If there is a BHT hit, the prediction is obtained from BHT. On a BHT miss, CRS is used for prediction of unconditional Return instructions. The prediction is read from CRS location P; then, P is decremented; if the value of P is 0, the decrement sets P to $N-1$. Conditional potential Returns that miss BHT are handled like any other branch that misses BHT.

Other types of branches access BHT and use the BHT on a hit. On a miss, either the sequential address is used or the computed address is used, depending on the hardware design. Certain instructions that are known to be taken or are very often taken will be predicted taken. Instructions known to be not taken will be predicted not taken. Others are predicted not taken. There are many other algorithms that could be used for prediction on BHT miss; and there are many algorithms for managing BHT. The algorithm selections are based on program characteristics and hardware constraints.

FIG. 5 describes the prediction update algorithm. On a Call instruction, BHT is updated. A BHT update consists of creating a new entry, if the original access was a miss. If the original access was a hit, the existing entry may be modified, according to the BHT algorithm selected. The CRS update pointer, U 304, is incremented with the same circular organization as for P. If the prediction for the Call was incorrect, the value now in U is copied to P.

On a Return instruction, as incorrect prediction also results in U copied to P. BHT is updated by creating a new entry or modifying the current entry. For a correct prediction made from CRS, U is decremented. For a correct prediction made from BHT, BHT is updated if necessary.

For other branches, BHT is updated if necessary. If the prediction was incorrect, U is copied to P.

This algorithm has several features requiring further explanation. Prediction of Calls and other non-return branches uses standard prediction algorithms. A conditional potential Return is also treated using standard prediction algorithms. This was based on particular program characteristics studied, which show that most conditional potential Returns are not taken. Unconditional potential returns most often function as Returns; therefore, the algorithm initially treats all of these as Return instructions. At update, an incorrect prediction of a Return results in the creation of a BHT entry. The prediction of potential Returns first looks for a BHT hit before using CRS. In this way, any Return successfully predicted using CRS is not entered in BHT and will be predicted using CRS next time. A potential Return incorrectly predicted using CRS is entered into BHT. Next time, this instruction is predicted using BHT. A BHT hit on a potential Return, therefore, indicates that the instruction should not be handled as a Return. This history distinguishes Returns and non-Returns without any additional bits required. Since the majority of potential Returns do function as Returns, the first time the instruction is encountered it is processed as a Return.

By using two CRS pointers, P and U, a Call instruction can save NSIA at prediction time, in case a Return is to be predicted before the Call is updated. Similarly a second Return can be predicted before a first Return is updated. If there are no overlapping Calls or Returns, U and P will point to the same element in CRS after the prediction update of an instruction.

A Call or Return on a speculative branch path updates P during prediction. If the instruction completes and prediction is updated, the normal algorithm applies. If any branch is predicted incorrectly, that branch resets P to the value of U during prediction update and cancels any instruction executing on the wrong path. Any speculative Call or Return instruction modifies P only; the value of U resets the pointer as if no speculative Call or Return had occurred.

Alternative Preferred Embodiments

There are many different implementations possible using the CRS described above.

Multiple Calls or Returns can be updated at once, if implemented. The update multiplexor 306 could also have +2 and −2 inputs 315 as shown in FIG. 3 to allow two Calls or two Returns to update at once. Predicting two Calls or two Returns requires two read and write ports to CRS stack 301 and +2 and −2 inputs 316 to multiplexor 308.

CRS can be used with different base prediction mechanisms. For example, another history-based prediction method is to include one or more bits for each instruction in the instruction cache. In this case, I-cache 103 and I-buffer 105 supply both branch instruction and prediction bit(s) 212, in FIG. 2. Branch test sends update information to I-cache on line 209, and BHT 201 and comparator 202 are not used. The bits from I-cache indicate the predicted direction for a branch. When predicted taken, the target address must be computed in the adder 205. For unconditional potential Return instructions, the bit can be used to indicate a Return or a non-Return. The bit should be initialized as Return. CRS is used when the instruction is treated as a Return. If CRS prediction is wrong, the instruction cache bit is changed to indicate non-Return. Otherwise, the algorithm is very similar to BHT prediction.

CRS can also be used without any history-based branch prediction. Any potential Return is processed using CRS. BHT 201 and comparator 202 do not exist.

Conditional potential Return instructions can be handled differently if there is another bit for history available. For example, in a BHT a hit means predict taken and a miss means predict not taken. A bit stored with a conditional potential Return can indicate a Return or non-Return. In instruction-cache based prediction, one bit indicates taken/non-taken and another indicates Return/non-Return.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A computer system method for the prediction of branch instruction target addresses for subroutine returns, comprising the steps of:
   saving subroutine return addresses within a series of storage locations;
   storing first data as a prediction pointer representative of the location of a first one of said series of storage locations, wherein a next subroutine prediction address to be used for predicting a return address from a subroutine is saved in said first one of said series of storage locations;
   storing second data as an update pointer representative of the location of a second one of said series of storage locations, wherein said update pointer is used to modify the prediction pointer in the event of an incorrect prediction of said return address from said subroutine;
   from a series of executable instructions having instruction opcodes, determining potential subroutine call instructions by identifying those instructions having opcodes corresponding to potential call instructions;
   from a series of executable instructions having instruction opcodes, determining potential subroutine return instructions by identifying those instructions having opcodes corresponding to potential return instructions; and
   verifying if a predicted address is correct by completing execution of potential call instructions or potential return instructions and comparing an address of an actual next instruction to be executed with said predicted address.

2. The method of claim 1 including
   a step for recording branch history of potential subroutine return instructions and/or
   a step for saving a status of pending potential subroutine return branch instructions.

3. The method of claim 2 where said step for saving status of pending branch instructions uses a branch queue.

4. The method of claim 3 where said branch queue contains the predicted target address for one or more pending branch instructions.

5. The method of claim 3 where said branch queue contains a bit indicating whether the return instruction was predicted using said branch history step or said subroutine address step for one or more pending return instructions.

6. The method of claim 2 where said step for recording branch history of subroutine instructions records the history in a branch history table.

7. The method of claim 2 whereby a potential return instruction not identified by said branch history step is predicted using said subroutine address saving step.

8. The method of claim 2 whereby a potential return instruction identified by said branch history step is predicted using said branch history step.

9. The method of claim 2 where said step for recording branch history of subroutine instructions stores history bits in an instruction cache of the computer system.

10. The method of claim 2 whereby a potential return instruction identified by said branch history step is predicted using said subroutine address saving step.

11. The method of claim 2 whereby a potential return instruction not identified by said branch history step is predicted using said branch history step.

12. The method of claim 2 where an entry is created in said branch history step for a potential subroutine instruction only if the instruction was predicted incorrectly using said subroutine address saving step.

13. The method of claim 1 comprising the following:
if a branch instruction to be predicted is identified by said step which determines a potential subroutine call instruction, saving the return address in said saving step in one of said series of storage locations represented by said prediction pointer and updating said prediction pointer by modifying said prediction pointer so as to represent another of said series of storage locations;
if a branch instruction to be predicted is identified by said step which determines a potential subroutine return instruction, the predicted address is determined by using the address in said saving step indicated by said prediction pointer and updating said prediction pointer by modifying said prediction pointer so as to represent another of said series of storage locations;
if the instruction execution is to be completed for a branch instruction identified by said step which determines a potential subroutine call instruction, updating said update pointer by modifying said update pointer so as to represent another of said series of storage locations;
if the instruction execution is to be completed for a branch instruction identified by said step which determines a potential subroutine return instruction that was predicted correctly, updating said update pointer by modifying said update pointer so as to represent another of said series of storage locations;
if the instruction execution is to be completed for any branch instruction predicted incorrectly, updating said prediction pointer so as to correspond to said update pointer.

14. The method of claim 13 where updating said prediction pointer is done by incrementing.

15. The method of claim 13 where updating said prediction pointer is done by decrementing.

16. The method of claim 13 where updating said update pointer is done by incrementing.

17. The method of claim 13 where updating said update pointer is done by decrementing.

18. The method of claim 13 where updating said prediction pointer on a wrong prediction is done by copying to said prediction pointer from said update pointer.

19. The method of claim 13 where two branches are predicted at a time.

20. The method of claim 13 where two branches are updated at a time.

21. The method of claim 13 where conditional potential subroutine returns are handled like other branches and not like potential subroutine return branches.

22. The method of claim 1 where said step for saving subroutine return addresses uses a plurality of return address registers, forming a register bank.

23. The method of claim 1 where said step for saving subroutine return addresses uses a single register; in which case there is no need for said step for storing first data as a prediction pointer and said step for storing second data as an update pointer.

24. The method of claim 1 where said step for storing first data as a prediction pointer uses a register.

25. The method of claim 1 where said step for storing second data as an update pointer uses a register.

26. The method of claim 1 where said step which determines a potential subroutine call instruction is performed by decode logic that examines the instruction.

27. The method of claim 1 where said step which determines a potential subroutine return instruction is performed by decode logic that examines the instruction.

28. The method of claim 1 where said prediction verification step uses a comparator comparing said predicted address and a correct address.

29. A computer system, comprising:
a main memory 101;
a second level cache 102 connected to said main memory;
an execution unit 108;
a first level data cache 104 coupled between said second level cache and said execution unit; and
a first level instruction cache 103;
said second level cache being connected to said first level data cache and adapted to transmit instructions to said first level instruction cache;
an instruction buffer 105 connected to said first level instruction cache and adapted to transmit instructions to said execution unit and to a branch unit 107;
said branch unit having bidirection communication to said instruction buffer and to said execution unit and adapted to transmit instruction addresses to said instruction cache; and
said branch unit comprises a system mechanism for the prediction of branch instruction target addresses for subroutine returns including:
means for saving subroutine return addresses within a series of storage locations;
means for storing first data as a prediction pointer representative of the location of a first one of said series of storage locations, wherein a next subroutine prediction address to be used for predicting a return address from a subroutine is saved in said first one of said series of storage locations;
means for storing second data as an update pointer representative of the location of a second one of said series of storage locations, wherein said update pointer is used to modify the prediction pointer in the event of an incorrect prediction of said return address from said subroutine;
means for determining, from a series of executable instructions having instruction opcodes, potential subroutine call instructions by identifying those instructions having opcodes corresponding to potential call instructions;
means for determining, from a series of executable instructions having instruction opcodes, potential subroutine return instructions by identifying those instructions having opcodes corresponding to potential return instructions; and means for verifying if a predicted address is correct by comparing, upon completion of execution of potential call instructions or potential return instructions, an address of an actual next instruction to be executed with said predicted address.

30. A computer system according to claim 29 wherein said means for saving subroutine return addresses includes one or more registers.

31. A computer system according to claim 29 wherein said means for storing first data as a prediction pointer includes a register for indexing into said means for saving subroutine addresses.

32. A computer system according to claim 29 wherein said means for storing second data as an update pointer includes a register for indexing into said means for saving subroutine addresses.

33. A computer system according to claim 29 wherein said means for determining potential subroutine call instructions includes logic to examine an instruction in an instruction buffer.

34. A computer system according to claim 29 wherein said means for determining potential subroutine return instructions includes logic to examine an instruction in an instruction buffer.

35. A computer system according to claim 29 wherein said means for verifying if a predicted address is correct includes a comparator.

* * * * *

UNITED STATES PATENT AND TRADEMARK OFFICE
CERTIFICATE OF CORRECTION

PATENT NO. : 5,313,634

DATED : May 17, 1994

INVENTOR(S) : James Eickemeyer

It is certified that error appears in the above-identified patent and that said Letters Patent is hereby corrected as shown below:

On title page, item [75] should read as follows:

--Richard James Eickemeyer--

Signed and Sealed this

Sixth Day of September, 1994

*Attest:*

BRUCE LEHMAN

*Attesting Officer*      *Commissioner of Patents and Trademarks*